United States Patent
Ahn

(10) Patent No.: US 8,339,148 B2
(45) Date of Patent: Dec. 25, 2012

(54) MULTI-CHANNEL CAPACITIVE SENSING CIRCUIT

(75) Inventor: Taedong Ahn, Seoul (KR)

(73) Assignee: Barun Electronics Co., Ltd., Gyeonggi-do (KR)

( * ) Notice: Subject to any disclaimer, the term of this patent is extended or adjusted under 35 U.S.C. 154(b) by 334 days.

(21) Appl. No.: 12/669,493

(22) PCT Filed: Aug. 24, 2007

(86) PCT No.: PCT/KR2007/004089
§ 371 (c)(1), (2), (4) Date: Jan. 18, 2010

(87) PCT Pub. No.: WO2009/011473
PCT Pub. Date: Jan. 22, 2009

(65) Prior Publication Data
US 2010/0188106 A1    Jul. 29, 2010

(30) Foreign Application Priority Data
Jul. 19, 2007   (KR) .................. 10-2007-0072444

(51) Int. Cl.
*G01R 27/26* (2006.01)

(52) U.S. Cl. .................. 324/678; 324/519; 324/686

(58) Field of Classification Search .................. 324/663, 324/678, 530, 683, 686, 519, 750.17, 754.28, 324/658; 73/780
See application file for complete search history.

(56) References Cited

U.S. PATENT DOCUMENTS

| | | | |
|---|---|---|---|
| 7,061,250 B2 * | 6/2006 | Tesdahl et al. | 324/530 |
| 7,119,551 B2 * | 10/2006 | Burdick | 324/658 |
| 7,514,917 B2 * | 4/2009 | Cech et al. | 324/228 |
| 2005/0005703 A1 | 1/2005 | Saito et al. | |
| 2005/0024065 A1 * | 2/2005 | Umeda et al. | 324/663 |
| 2007/0152682 A1 * | 7/2007 | Ungaretti et al. | 324/678 |

FOREIGN PATENT DOCUMENTS

| | | |
|---|---|---|
| JP | 10-239196 | 9/1998 |
| JP | 2003-28741 | 1/2003 |
| KR | 10-2003-0087765 | 11/2003 |

* cited by examiner

*Primary Examiner* — Timothy J Dole
*Assistant Examiner* — Alesa Allgood
(74) *Attorney, Agent, or Firm* — Mark M Friedman

(57) ABSTRACT

Provided is a multi-channel capacitive sensing circuit, in which at least one capacitive sensor has the capacitance changed corresponding to the change of external environment, and generates change signals corresponding to the capacitance change, respectively. An oscillator outputs a carrier wave modulating the capacitance change signal. At least one capacitance-to-voltage converter receives the capacitance change signals modulated by means of the carrier wave and outputs voltage signals corresponding to the modulated capacitance change signals, respectively. A multiplexer receives the voltage signals, selects any one of the voltage signals and sequentially outputs them. An analog-to-digital converter (ADC) receives the voltage signals outputted from the multiplexer, converts them into digital voltage signals and outputs them. Accordingly, it is possible to output the capacitance change signals each generated in the at least one capacitance sensor to one ADC using the multiplexer. As a result, it is possible to reduce the size of the multi-channel capacitive sensing circuit and reduce the power consumption.

8 Claims, 3 Drawing Sheets

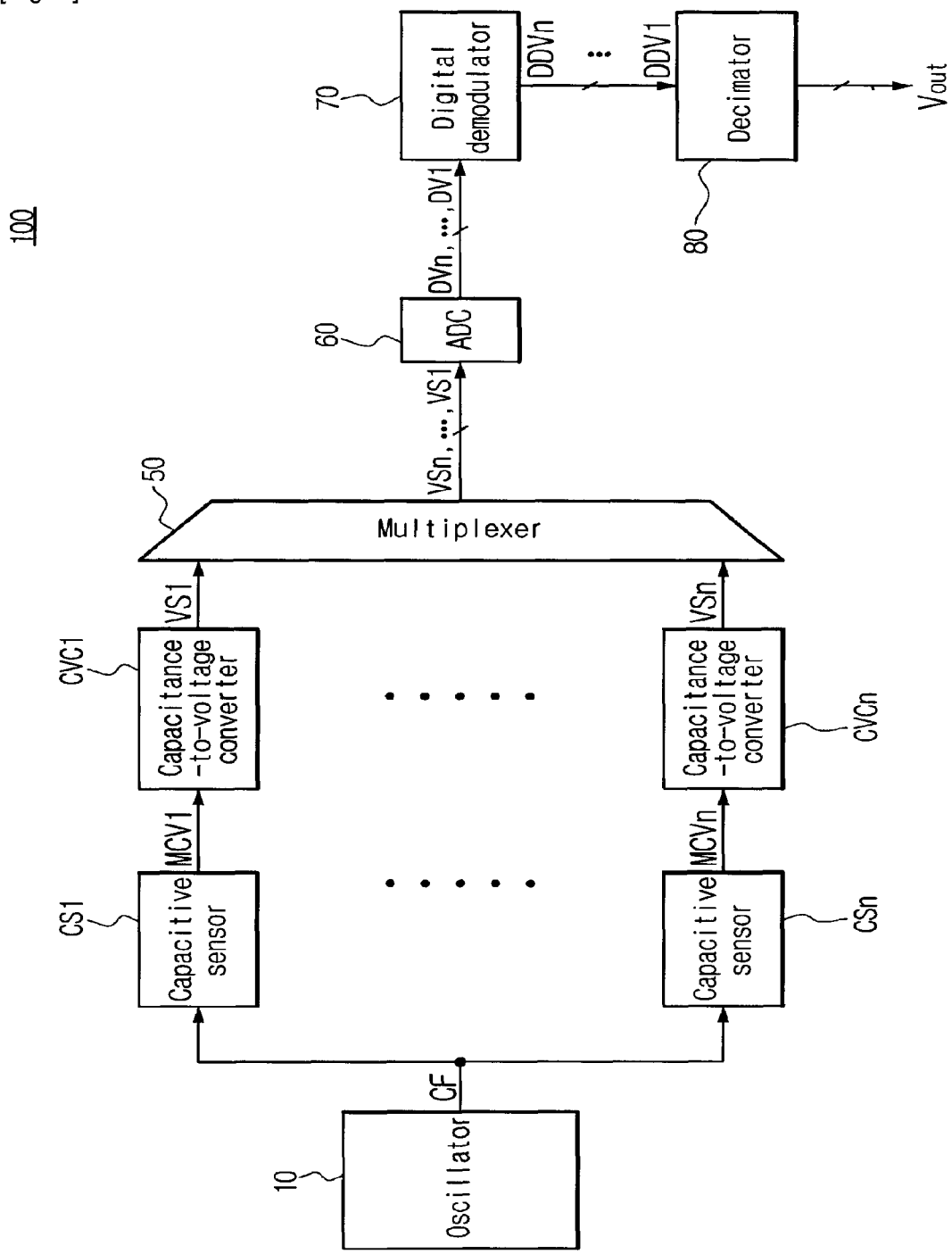
[Fig. 1]

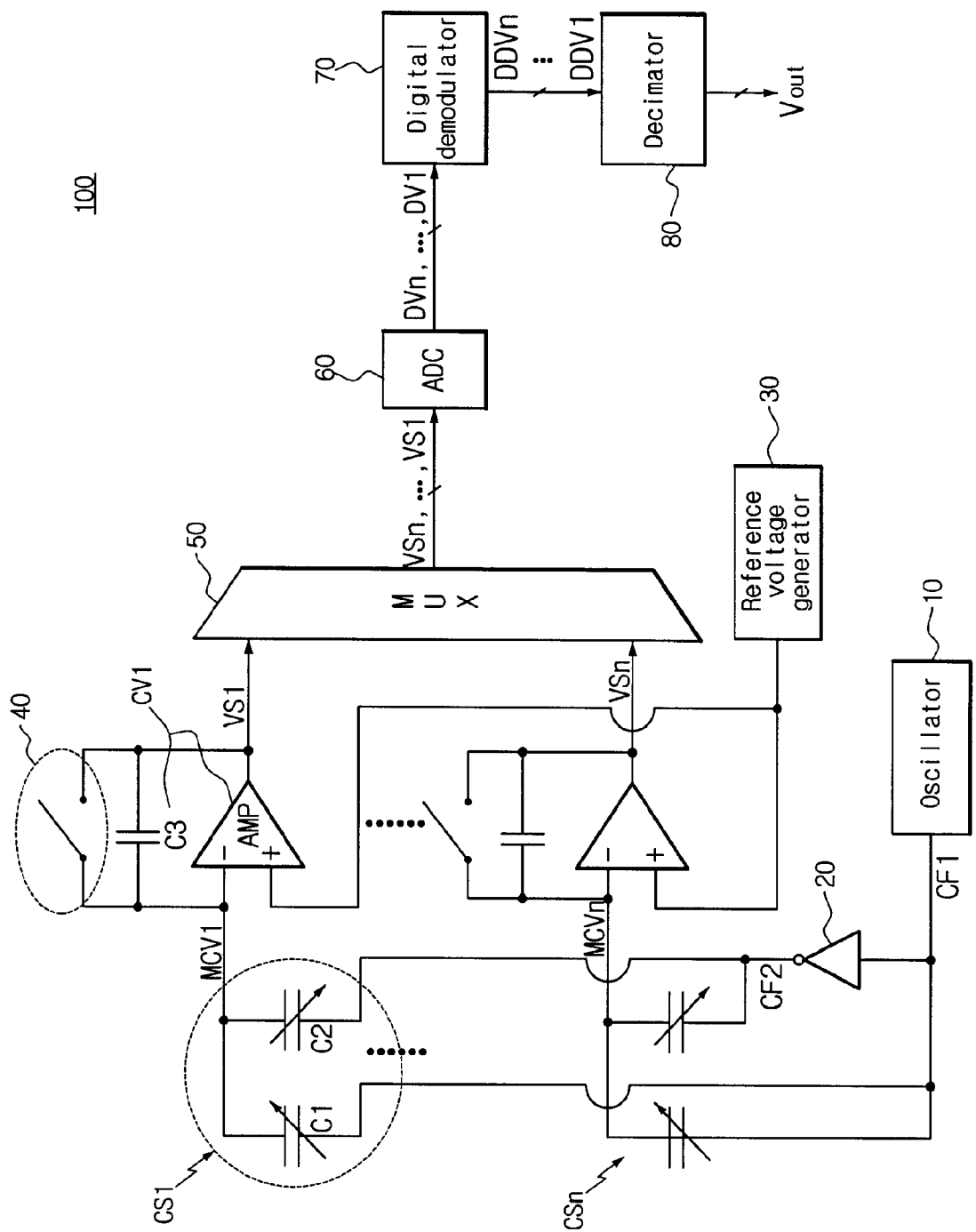
[Fig. 2]

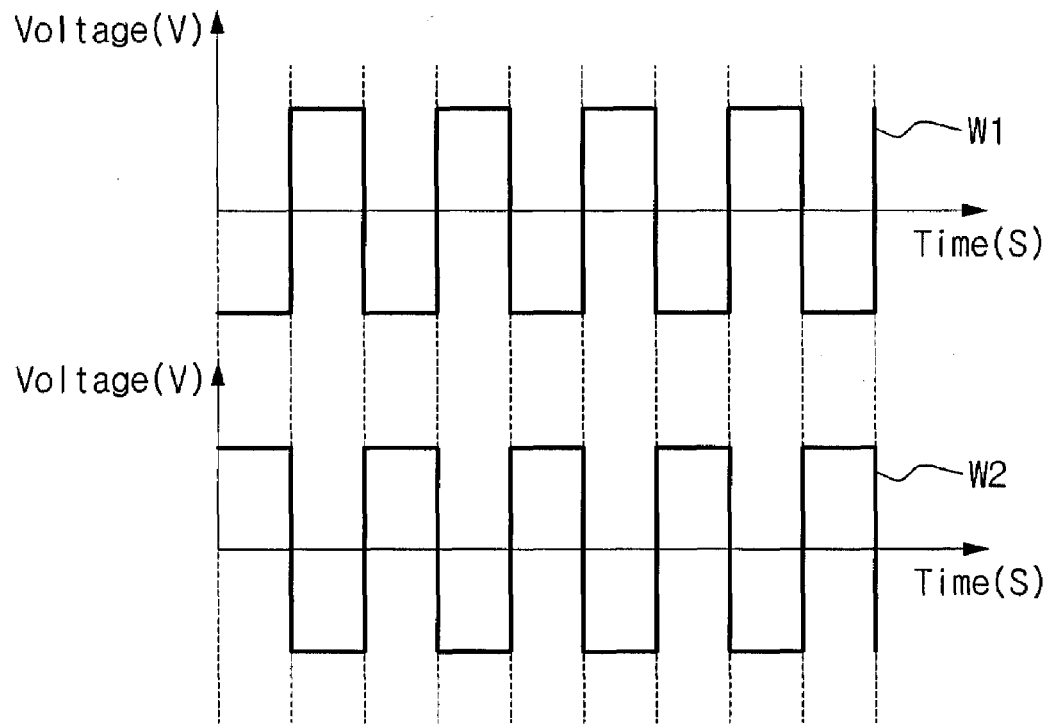
[Fig. 3]
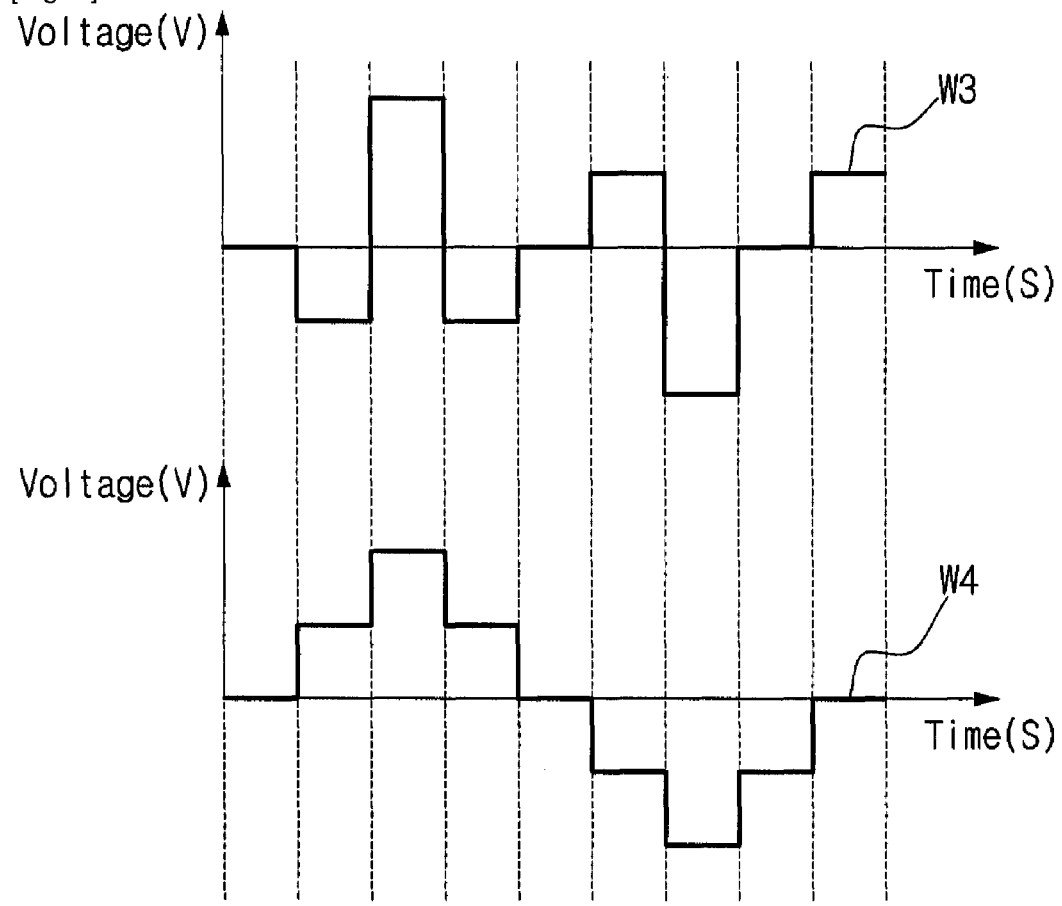
[Fig. 4]

MULTI-CHANNEL CAPACITIVE SENSING CIRCUIT

RELATED APPLICATIONS

This patent application is a National Stage of PCTKR2007/004089 filed on Aug. 24, 2007, which claims priority of Korean Patent Application No. 10-2007-0072444 filed Jul. 19, 2007, the contents of which are incorporated herein by reference.

TECHNICAL FIELD

The present invention relates to a multi-channel capacitive sensing circuit, and more specifically relates to a multi-channel capacitive sensing circuit capable of reducing power consumption and improving sensing reliability.

BACKGROUND ART

In a capacitive sensor, the capacitance of a capacitor is changed by the change of external environment, and a capacitance change signal corresponding to the capacitance change is outputted to sense the change of the external environment. A capacitive sensing circuit is a circuit detecting the capacitance change signal generated by the capacitive sensor. In the case of processing the capacitance change signal as an analog signal, noise cannot be avoided since the capacitance change signal is a low frequency signal. Therefore, the sensing reliability of the capacitive sensing circuit is deteriorated.

Also, in the case of using at least one analog-to-digital converter in order to process the capacitance change signal generated in at least one capacitive sensor as a digital signal, the size of the capacitive sensing circuit is enlarged, and power consumption is considerable since power must be supplied to each of the at least one analog-to-digital converter.

DISCLOSURE OF INVENTION

Technical Problem

Therefore, it is an object of the present invention to provide a multi-channel capacitive sensing circuit capable of reducing power consumption and improving sensing reliability.

Technical Solution

In order to accomplish the above object, the present invention provides a multi-channel capacitive sensing circuit comprising: at least one capacitive sensor, an oscillator, at least one capacitance-to-voltage converter, a multiplexer, and an analog-to-digital converter (ADC).

The at least one capacitive sensor has the capacitance changed corresponding to the change of external environment, and generates capacitance change signals corresponding to the capacitance change, respectively. The oscillator outputs a carrier wave modulating the capacitance change signal. Each of the at least one capacitance-to-voltage converter receives the capacitance change signals modulated by means of the carrier wave and outputs voltage signals corresponding to the modulated capacitance change signals, respectively. The multiplexer receives the voltage signals and selects any one of the voltage signals to sequentially output it. The ADC receives the voltage signals outputted from the multiplexer and converts the voltage signals into digital voltage signals and outputs them. The ADC carries out oversampling.

Each of the at least one capacitive sensor comprises a first capacitor and a second capacitor whose capacitances are changed by different amount with respect to the change of external environment. The oscillator is electrically connected to the first and second capacitors, and outputs the carrier wave to the first and the second capacitors.

Also, the multi-channel capacitive sensing circuit further comprises an inverter electrically connected to the oscillator and the second capacitor. The inverter receives the carrier wave and outputs an anti-phase carrier wave to the second capacitor.

Each of the at least one capacitance-to-voltage converter comprises an operational amplifier and a capacitor. Herein, the multi-channel sensing circuit further comprises a switch electrically connected to the negative input terminal of the operational amplifier and the output terminal of the operational amplifier and periodically forming a DC path by repeating on/off operations at predetermined intervals.

The multi-channel capacitive sensing circuit further comprises a digital demodulator demodulating the digital voltage signals from the ADC and outputting the demodulated voltage signals. Also, the multi-channel capacitive sensing circuit further comprises a decimator receiving the demodulated voltage signals and decimating them with a decimation ratio of 1/k to output them.

Advantageous Effects

According to the inventive multi-channel capacitive sensing circuit, it is possible to output the capacitance change signals each generated in the at least one capacitive sensor to one ADC using the multiplexer. Therefore, it is possible to easily detect the capacitance change signals each generated in the at least one capacitive sensor as digital voltage signals. As a result, it is possible to reduce the size of the multi-channel capacitive sensing circuit and reduce the power consumption.

In addition, it is possible to remove the noise by processing the capacitance change signals, which are analog signals, as the digital signal using the ADC, the digital demodulator, and the decimator. As a result, it is possible to improve the sensing reliability of the multi-channel capacitive sensing circuit.

BRIEF DESCRIPTION OF THE DRAWINGS

FIG. 1 is a block diagram of a multi-channel capacitive sensing circuit according to an embodiment of the present invention.

FIG. 2 is a view showing the multi-channel capacitive sensing circuit according to an embodiment of the present invention.

FIG. 3 is a view showing signal waveforms outputted from the oscillator and the inverter shown in FIG. 2.

FIG. 4 is a view showing signal waveforms output form the ADC and the digital demodulator shown in FIG. 2.

MODE FOR THE INVENTION

Hereinafter, preferred embodiments of the present invention will be described in detail with reference to accompanying drawings. The present invention is not limited to the embodiment explained herein, but can be applied and modified in a variety of forms. The following embodiments are provided in order to make the technical idea disclosed in the present invention more clear, and enable the technical idea of the present invention to be sufficiently understood by those skilled in the art to which the present invention pertains. Therefore, the scope of the present invention should not be interpreted as being limited to the embodiments to be described below. Also, in the drawings provided together with the embodiments, each region may be simplified or somewhat exaggerated in order to provide a clearer description. The same reference numbers in the drawings will indicate the same components.

FIG. 1 is a block diagram of a multi-channel capacitive sensing circuit according to an embodiment of the present invention.

Referring to FIG. 1, the multi-channel capacitive sensing circuit 100 according to an embodiment of the present invention comprises at least one capacitive sensor CS1 to CSn, an oscillator 10, at least one capacitance-to-voltage converter CVC1 to CVCn, a multiplexer (hereinafter "MUX" 50, and an ADC 60.

Each of the at least one capacitive sensor CS1 to CSn comprises capacitors (not illustrated, see FIG. 2) the capacitances of which are changed corresponding to the change of external environment, and generates capacitance change signals corresponding to the capacitance change. The at least one capacitive sensor CS1 to CSn generates the capacitance change signals of the capacitors corresponding to the change of external environment, for example, the change in temperature and pressure. Therefore, it is possible to easily sense the change of external environment by detecting the capacitance change signal.

The oscillator 10 outputs a carrier wave CF1 modulating the capacitance change signals to high frequency signals. The capacitance change signals generated by the at least one capacitive sensor CS1 to CSn are modulated to the high frequency signals by means of the carrier wave CF1. Therefore, generation of low frequency noise can be prevented. As an example, the oscillator 10 may be a chopper oscillator. In the embodiment of the present invention, the oscillator 10 outputs a square wave as the carrier wave CF1.

The multi-channel capacitive sensing circuit 100 comprises the at least one capacitance-to-voltage converter CVC1 to CVCn in order to detect the capacitance change signals each generated in the at least one capacitive sensor CS1 to CSn as the voltage signals VS1 to VSn. Each of the at least one capacitance-to-voltage converter CVC1 to CVCn receives the modulated capacitance change signals MCV1 to MCVn, and converts the modulated capacitance change signals MCV1 to MCVn into the voltage signals VS1 to VSn and outputs them, respectively. The number of the at least one capacitive sensor CS1 to CSn corresponds to that of the at least one capacitance-to-voltage converter CVC1 to CVCn.

The MUX 50 receives the voltage signals VS1 to VSn, selects any one of the voltage signals VS1 to VSn, and sequentially outputs it. In the embodiment of the present invention, the MUX 50 selects any one of the received voltage signals VS1 to VSn corresponding to the sequence of the at least one capacitive sensor CS1 to CSn and outputs it.

The ADC 60 receives the voltage signals VS1 to VSn outputted from the MUX 50, converts the input voltage signals VS1 to VSn into digital voltage signals DV1 to DVn, and outputs them. The ADC 60 performs double sampling of the voltage signals VS1 to VSn from the MUX 50 or oversampling of them at a rate of several tens KHz or more.

The multi-channel capacitive sensing circuit 100 further comprises a digital demodulator 70 receiving the digital voltage signals DV1 to DVn from the ADC 60 and outputting the demodulated voltage signals DDV1 to DDVn. The digital demodulator 70 removes the carrier wave CF1 and an anti-phase carrier wave CF2 from the digital voltage signals DV1 to DVn, and converts the digital voltage signals DV1 to DVn into envelope signals.

As described above, by connecting the at least one capacitive sensor CS1 to CSn to the single ADC 60 using the MUX 50, it is possible to convert the capacitance change signals each generated in the at least one capacitive sensor CS1 to CSn into the digital voltage signals DV1 to DVn with the single ADC 60. Accordingly, it is possible to reduce the size of the multi-channel capacitive sensing circuit 100, and reduce power consumption as compared to the case of connecting the at least one capacitive sensor CS1 to CSn to more than one ADC.

Also, by demodulating the digital voltage signals DV1 to DVn using the digital demodulator 70, it is possible to remove offset and increase of noise generated in an analog demodulator. As one example of the present invention, the digital demodulator 70 sequentially multiplies the digital voltage signals DV1 to DVn by +1 and −1 at the same period as that of the carrier wave CF1, and outputs the demodulated voltage signals DDV1 to DDVn.

The multi-channel capacitive sensing circuit 100 further comprises a decimator 80 receiving the demodulated voltage signals DDV1 to DDVn and decimating them with a decimation ratio of 1/k. The decimator 80 periodically groups k over-sampled demodulated voltage signals DDV1 to DDVn, averages them and outputs as one output voltage Vout. It is possible to increase the number of valid bits of the demodulated voltage signals DDV1 to DDVn by means of the decimator 80. Therefore, it is possible to reduce white noise level and raise signal-to-noise ratio (SNR) of the output voltage Vout. Since the capacitance change signals are generally low frequency signals of several hundred Hz, it is possible to raise the SNR through such a decimation.

FIG. 2 is a view showing the multi-channel capacitive sensing circuit according to an embodiment of the present invention. The same components as the components shown in FIG. 1 are indicated by the same reference numerals and the specific description thereto will be omitted.

Referring to FIG. 2, the multi-channel capacitive sensing circuit 100 comprises at least one capacitive sensor CS1 to CSn, an oscillator 10, at least one capacitance-to-voltage converter CVC1 to CVCn, a MUX 50, an ADC 60, a digital demodulator 70, and a decimator 80.

In this embodiment, each of the at least one capacitive sensor CS1 to CSn comprises a first capacitor C1 and a second capacitor C2 whose capacitances are changed by different amount corresponding to the change of external environment. The at least one capacitive sensor CS1 to CSn is a differential type of capacitive sensor with the changes in capacitance of the first and second capacitors C1 and C2 corresponding to the change of external environment different from each other. Accordingly, since the amounts of capacitance change of the first and second capacitors C1 and C2 are different, the total amount of capacitance change of each of the at least one capacitive sensor Cs1 to CSn with respect to the change of external environment become relatively large. Therefore, the at least one capacitive sensor CS1 to CSn can detect even minute change of external environment as the corresponding capacitance change signals, and hence the accuracy of the multi-channel capacitive sensing circuit 100 is improved.

The oscillator 10 is electrically connected to the first and second capacitors C1 and C2, and outputs the carrier wave CF1 to the first and second capacitors C1 and C2. Also, the multi-channel capacitive sensing circuit 100 further comprises an inverter 20 electrically connected the oscillator 10 and the second capacitor C2. The inverter 20 receives the carrier wave CF1 outputted from the oscillator 10 and outputs an anti-phase carrier wave CF2, which is in anti-phase to the carrier wave CF1, to the second capacitor C2. In this embodiment, by modulating the capacitance change signals of the differential-type capacitive sensors CS1 to CSn with the carrier wave CF1 and the anti-phase carrier wave CF2, it is possible to remove common mode noise and low frequency noise such as 1/f noise, etc.

The first and second capacitance change signals respectively generated at the first and second capacitors C1 and C2 are modulated by means of the carrier wave and the anti-phase carrier wave CF1 and CF2, respectively, and then, are synthesized into the modulated capacitance change signal MCV1. Therefore, the at least capacitive sensor CS1 to CSn generates the modulated capacitance change signals MCV1 to MCVn, respectively.

Each of the at least one capacitance-to-voltage converter CVC1 to CVCn comprises an operational amplifier AMP and a third capacitor C3. The operational amplifier AMP and the third capacitor C3 are connected in parallel, and the negative input terminal of the operational amplifier AMP is connected to the output terminal of each of the at least one capacitive sensor CS1 to CSn and one end of the third capacitor C3. The output terminal of the operational amplifier AMP is connected to the other end of the third capacitor C3 and the input terminal of the MUX 50. Also, the positive input terminal of the operational amplifier AMP is connected to a reference voltage generator 30, and is biased to reference voltage.

The multi-channel capacitive sensing circuit 100 comprises a switch 40 electrically connected across the at least one capacitance-to-voltage converter CVC1 to CVCn, respectively, and repeating on/off operations at predetermined intervals. One end of the switch 40 is connected to the negative input terminal of the operational amplifier AMP and one end of the third capacitor C3, and the other end of the switch 40 is connected to the output terminal of the operational amplifier AMP and the other end of the third capacitor C3.

When the switch 40 is turned off, the modulated capacitance change signals MCV1 to MCVn are respectively amplified by the at least one capacitance-to-voltage converter CVC1 to CVCn, and are converted into the voltage signals Vs1 to VSn. Meanwhile, when the switch is turned on, the switch performs the role of a buffer that maintains the voltages of the negative input terminal and output terminal of the operational amplifier AMP identical so as to form a DC path in the negative input terminal of the operational amplifier AMP. Therefore, a phenomenon that the negative input terminal of the operational amplifier AMP is saturated with supply voltage or ground voltage is prevented, so that the stability of the multi-channel capacitive sensing circuit 100 can be improved.

The voltage signals VS1 to VSn outputted by the operational amplifier AMP are sequentially outputted as an output voltage Vout via the MUX 50, the ADC 60, the digital demodulator 70, and the decimator 80.

FIG. 3 is a view showing signal waveforms outputted from the oscillator and the inverter shown in FIG. 2, and FIG. 4 is a view showing signal waveforms outputted form the ADC and the digital demodulator shown in FIG. 2.

Referring to FIG. 3, a first waveform W1 indicates one form of the carrier wave CF1 outputted from the oscillator 10, and a second waveform W2 indicates one form of the anti-phase carrier wave CF2 outputted from the inverter 20. In this embodiment, the first and second waveforms W1, W2 are square waves, and have phases opposite to each other based on a time axis. The vertical axis indicates voltage V.

Referring to FIG. 4, a third waveform W3 indicates one form of any one of the digital voltage signals DV1 to DVn outputted from the ADC 60, in the case of modulating the capacitance change signals using the first and second waveforms W1, W2 shown in FIG. 3.

A fourth waveform W4 indicates one form of any one of the demodulated voltage signals DDV1 to DDVn outputted from the digital demodulator 70, in the case of demodulating the third waveform W3 using the digital demodulator 70. The fourth waveform W4 is obtained by sequentially multiplying the third waveform W3 by +1 and −1 at the same period as the period of the carrier wave CF1, that is, the period of the first waveform W1. In the case of multiplying the third waveform W3 by +1, the phase of the fourth waveform W4 is the same as that of the third waveform W3. On the other hand, in the case of multiplying the third waveform W3 by −1, the phase of the fourth waveform W4 becomes symmetric to that of the third waveform W3 with regard to a time axis S and anti-phase to that of the third waveform W3.

INDUSTRIAL APPLICABILITY

According to a multi-channel capacitive sensing circuit provided by the present invention, it is possible to output capacitance change signals each generated in at least one capacitive sensor to a single ADC using a multiplexer. Therefore, it is possible to easily detect the capacitance change signals each generated in the at least one capacitive sensor as digital voltage signals. As a result, it is possible to reduce the size of the multi-channel capacitive sensing circuit and reduce the power consumption.

In addition, it is possible to remove the noise by processing the capacitance change signals, which are analog signals, as the digital signal using the ADC, the digital demodulator, and the decimator. As a result, it is possible to improve the sensing reliability of the multi-channel capacitive sensing circuit.

While the invention has been described in detail and with reference to specific embodiments thereof, it will be apparent to one skilled in the art that various changes and modifications can be made therein without departing from the spirit and scope of thereof.

What is claimed is:

1. A multi-channel capacitive sensing circuit comprising:
   at least one capacitive sensor having capacitance changed corresponding to the change of external environment and generating capacitance change signals corresponding to the capacitance change, respectively;
   an oscillator outputting a carrier wave modulating the capacitance change signal;
   at least one capacitance-to-voltage converter each receiving the capacitance change signals modulated by means of the carrier wave and outputting voltage signals corresponding to the modulated capacitance change signals, respectively;
   a multiplexer receiving the voltage signals and selecting any one of the voltage signals to sequentially output it; and
   an analog-to-digital converter (ADC) receiving the voltage signals outputted from the multiplexer, converting the voltage signals into digital voltage signals and outputting them,
   wherein each of the at least one capacitive sensor comprises a first capacitor and a second capacitor whose capacitances are changed by different amount with respect to the change of external environment,
   wherein the oscillator is electrically connected to the first and second capacitors and outputs the carrier wave to the first and the second capacitors, wherein the oscillator is a chopper oscillator, and
further comprising an inverter electrically connected to the oscillator and the second capacitor, receiving the carrier wave, and outputting an anti-phase carrier wave having a phase opposite to that of the carrier wave.

2. The multi-channel capacitive sensing circuit according to claim 1, wherein the carrier wave is a square wave.

3. The multi-channel capacitive sensing circuit according to claim 1, wherein each of the at least one capacitance-to-voltage converter comprises an operational amplifier and a capacitor.

4. The multi-channel capacitive sensing circuit according to claim 3, further comprising a switch electrically connected to the negative input terminal of the operational amplifier and the output terminal of the operational amplifier and repeating on/off operations at predetermined intervals.

5. The multi-channel capacitive sensing circuit according to claim 1, further comprising a digital demodulator demodulating the digital voltage signals from the ADC and outputting the demodulated voltage signals.

6. The multi-channel capacitive sensing circuit according to claim 5, wherein the digital demodulator sequentially multiplies the demodulated voltage signals by +1 and −1 at the same period as that of the carrier wave.

7. The multi-channel capacitive sensing circuit according to claim 5, wherein the ADC performs oversampling.

8. The multi-channel capacitive sensing circuit according to claim 7, further comprising a decimator receiving the demodulated voltage signals, decimating them with a decimation ratio of 1/k and outputting them.

* * * * *